US006974222B2

(12) United States Patent
Mascadri et al.

(10) Patent No.: US 6,974,222 B2
(45) Date of Patent: Dec. 13, 2005

(54) LIGHT DISTRIBUTION PLENUM FOR AN ILLUMINATED CONTROL ASSEMBLY AND METHOD

(75) Inventors: Anthony Mascadri, Marysville, OH (US); John Heal, Hillsboro, OH (US)

(73) Assignee: Honda Motor Company, Ltd., Tokyo (JP)

( * ) Notice: Subject to any disclaimer, the term of this patent is extended or adjusted under 35 U.S.C. 154(b) by 104 days.

(21) Appl. No.: 10/403,763

(22) Filed: Mar. 31, 2003

(65) Prior Publication Data

US 2004/0190302 A1 Sep. 30, 2004

(51) Int. Cl.[7] ................................................ H01H 9/18
(52) U.S. Cl. ............................ 362/85; 362/30; 362/95; 362/511; 200/310; 359/618
(58) Field of Search ............................ 362/26, 30, 560, 362/489, 511, 23, 28, 29, 551, 554, 555, 558, 362/559, 459, 471, 473, 474, 487, 488, 509, 362/543, 544, 545, 362, 85, 95; 359/618, 359/629, 631, 638; 40/541, 546, 547; 200/52 R, 200/56 R, 61.54, 237, 308, 310–317

(56) References Cited

U.S. PATENT DOCUMENTS

| | | | | | |
|---|---|---|---|---|---|
| 2,724,766 | A | * | 11/1955 | Hawley et al. | 362/560 |
| 4,163,883 | A | * | 8/1979 | Boulanger | 200/314 |
| 4,213,171 | A | | 7/1980 | Sassmannshausen | 362/310 |
| 4,319,307 | A | | 3/1982 | Turner | 362/474 |
| 4,779,169 | A | | 10/1988 | Cruze | 362/474 |
| 4,797,791 | A | | 1/1989 | Burchick | 362/473 |
| 5,008,782 | A | | 4/1991 | Murray | 362/474 |
| 5,063,479 | A | * | 11/1991 | Satoh | 362/555 |
| 5,077,644 | A | | 12/1991 | Schaller et al. | 362/184 |
| 5,327,328 | A | * | 7/1994 | Simms et al. | 362/26 |
| 5,406,465 | A | | 4/1995 | Farchione | 362/473 |
| 5,454,580 | A | | 10/1995 | Lin | 280/291 |
| 5,559,911 | A | * | 9/1996 | Forkner et al. | 385/33 |
| 5,795,050 | A | | 8/1998 | Carter | 362/474 |
| 5,874,901 | A | * | 2/1999 | Ohyama | 340/815.42 |
| 6,081,190 | A | | 6/2000 | Kellermann | 340/465 |
| 6,139,176 | A | * | 10/2000 | Hulse et al. | 362/581 |
| 6,204,752 | B1 | | 3/2001 | Kishimoto | 340/432 |
| 6,308,590 | B1 | | 10/2001 | Berto | 74/551.8 |
| 6,356,394 | B1 | * | 3/2002 | Glienicke | 359/641 |
| 6,577,794 | B1 | * | 6/2003 | Currie et al. | 385/101 |

* cited by examiner

*Primary Examiner*—Thomas M. Sember
*Assistant Examiner*—Ismael Negron
(74) *Attorney, Agent, or Firm*—Dinsmore & Shohl LLP

(57) ABSTRACT

A light distribution plenum includes a shell having an interior surface substantially defining a cavity. A light source receptor is configured to receive light from a light source into the cavity in use. A first optical avenue is associated with the shell and is configured to direct a portion of the light to a first control device. A second optical avenue is associated with the shell, is spaced from the first optical avenue, and is configured to direct a portion of the light to a second control device. At least one selective optic is at least partially within the light distribution plenum and is configured to interact with at least some portion of the light. An illuminated control assembly including a light distribution plenum, a motor vehicle including an illuminated control assembly, and a method of illuminating first and second control devices are also provided.

39 Claims, 10 Drawing Sheets

LIGHT DISTRIBUTION PLENUM FOR AN ILLUMINATED CONTROL ASSEMBLY AND METHOD

TECHNICAL FIELD

The present invention relates to illuminated control assemblies. More particularly, a light distribution plenum can be disposed adjacent to first and second control devices and configured to selectively direct light supplied by a light source to the first control device through a first optical avenue and to the second control device through a second optical avenue.

BACKGROUND OF THE INVENTION

Control devices are present on nearly all electrical and mechanical equipment, including motor vehicles, to facilitate operation of the equipment by a consumer. Common examples of such control devices are switches, pushbuttons, gauges, meters, indicator lights, levers, valves, mechanical actuators, knobs, and other such devices. One common piece of equipment having a plurality of control devices is a motorcycle. A motorcycle typically includes multiple pushbuttons and/or switches on its handlebars to facilitate a driver's control of turn signals, driving lights, engine functions, accessories, gear selection, and/or other aspects of the motorcycle's operation.

Because motorcycles are often operated after dusk and prior to dawn, it is advantageous that any control devices on a motorcycle have the ability to be illuminated in order that the driver can easily locate and operate such control devices in the dark. One conventional manner by which to illuminate such control devices is through backlighting. For example, with regard to a pushbutton, a light can be disposed beneath a translucent cap whereby some of the light generated by the light source penetrates the cap and is accordingly visible to an operator, thereby enabling the operator to effectively locate and operate the pushbutton in the dark. Similarly, with regard to a switch, a light source can be disposed beneath a translucent rocker whereby a portion of the light generated by the light source is viewable to an operator through the rocker, thereby enabling the operator to effectively locate and operate the switch in the dark. However, such backlighting can dramatically increase the complexity, size and cost of the associated control devices, especially when such control devices must be water resistant or waterproof and/or when specific space or size configurations must be satisfied. Furthermore, it is difficult to achieve sufficient durability from waterproof control devices having backlights.

Accordingly, there is a need for a control assembly having illuminated control devices that do not involve conventional backlighting. In addition, there is a need in the art for a single apparatus configured to illuminate multiple control devices, even though these control devices might have different locations with respect to the apparatus and/or have different heights or levels with respect to each other. Furthermore, there is a need for such an apparatus that does not generate excessive glare-causing light and that does not cast unsatisfactory shadows upon the illuminated control devices. Still further, there is a need for such an apparatus that is less expensive, more versatile, simpler, more reliable, more aesthetically pleasing, more durable, more effective, and more energy efficient than conventional control illumination arrangements.

SUMMARY OF THE INVENTION

Accordingly, it is an aspect of the present invention to provide an improved apparatus and method for illuminating multiple control devices on a control panel. It is another aspect to provide a motor vehicle having a control panel with at least two control devices adjacent to a light distribution plenum, wherein the light distribution plenum is configured to selectively illuminate both control devices.

To achieve the foregoing and other aspects, and in accordance with the purposes of the present invention defined herein, a light distribution plenum is provided for directing light to first and second control devices spaced from the plenum. The light distribution plenum comprises a shell having an interior surface substantially defining a cavity. A light source receptor is configured to receive light from a light source into the cavity in use, and a first optical avenue associated with the shell is configured to direct a portion of the light to a first control device. A second optical avenue associated with the shell and spaced from the first optical avenue is configured to direct a portion of the light to a second control device. At least one selective optic is at least partially within the light distribution plenum and is configured to interact with at least some portion of the light.

In accordance with a further embodiment of the present invention, an illuminated control assembly is disclosed comprising first and second control devices attached to a control panel. A light distribution plenum is also attached to the control panel adjacent to the first and second control devices and comprises an interior surface substantially defining a cavity. A light source supplies light into the cavity and a first optical avenue in said light distribution plenum is configured to direct a portion of the light to illuminate at least part of the first control device. A second optical avenue in said light distribution plenum is different from the first optical avenue and is configured to direct a portion of the light to illuminate at least part of the second control device, wherein at least one selective optic is associated with said light distribution plenum and is configured to interact with at least a portion of the light.

In accordance with still another embodiment of the present invention, a motor vehicle is disclosed having an illuminated control assembly, the motor vehicle comprising first and second control devices attached to a control panel. A light distribution plenum is also attached to the control panel adjacent to the first and second control devices and comprises an interior surface substantially defining a cavity. A light source supplies light into the cavity and a first optical avenue is configured to direct a portion of the light to illuminate at least part of the first control device. A second optical avenue is different from the first optical avenue and is configured to direct a portion of the light to illuminate at least part of the second control device, wherein at least one selective optic is associated with said light distribution plenum and is configured to interact with at least a portion of the light.

In accordance with yet another embodiment of the present invention, a method for illuminating first and second control devices is disclosed. The method comprises providing a light distribution plenum having a selective optic and a cavity in communication with different first and second optical avenues, and locating a first control device adjacent to the first optical avenue, and a second control device adjacent to the second optical avenue. Light from a source is emitted into the cavity such that the light interacts with the selective optic and a portion of the light passes through the first optical avenue and a portion of the light passes through the second optical avenue, thereby illuminating the first and second control devices.

Additional aspects, advantages, and novel features of the invention will be set forth in part in the description that follows, and in part will become apparent to those skilled in the art upon examination of the following or may be learned with the practice of the invention. The aspects and advantages of the invention may be realized and attained by means of the instrumentalities and combinations particularly pointed out in the appended claims.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION OF EXEMPLARY EMBODIMENTS

Figure 1:
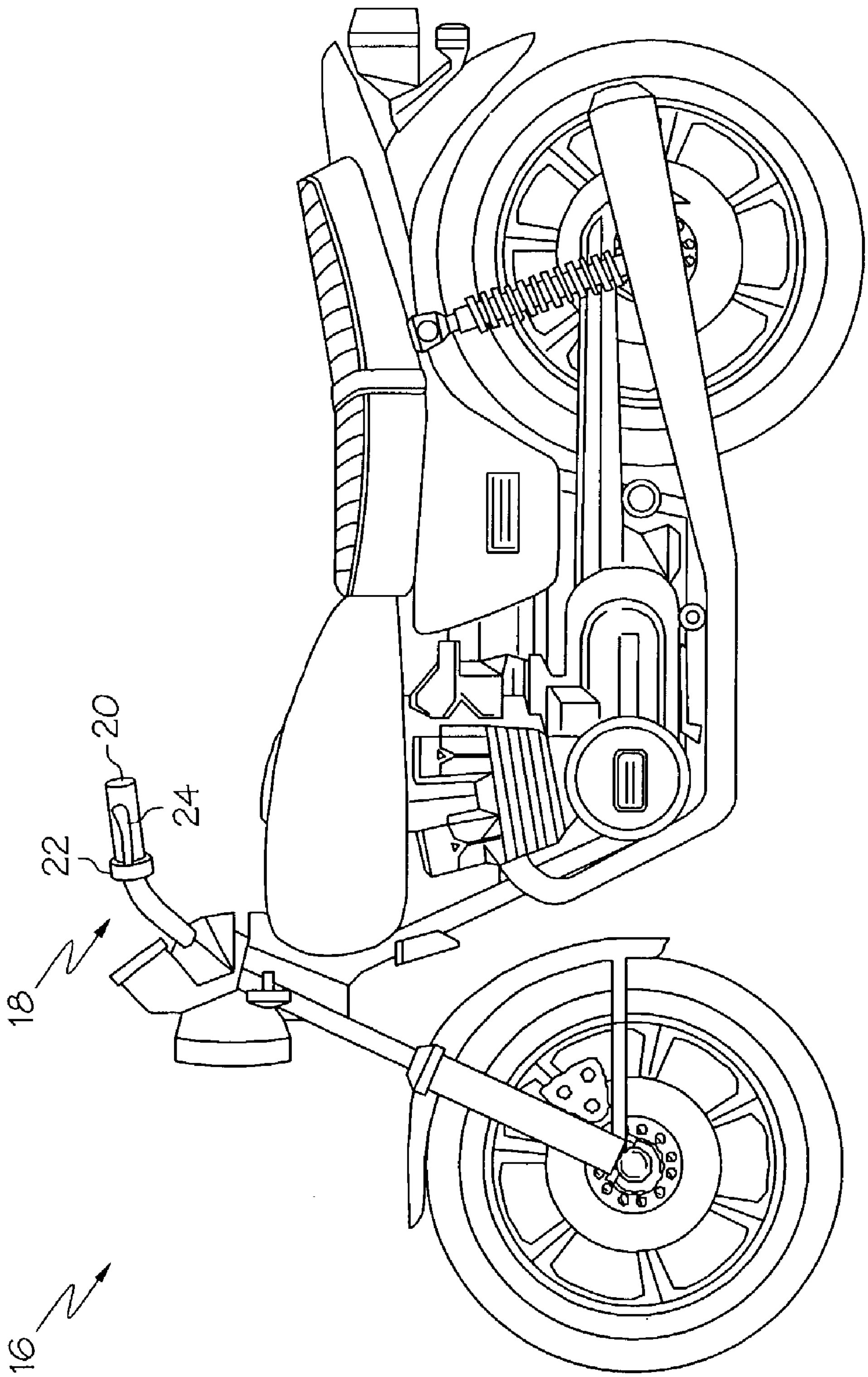
FIG. 1 is a side elevational view depicting a motorcycle having an illuminated control assembly in accordance with one embodiment of the present invention.

The present invention and its operation is hereinafter described in detail in connection with the views and examples of FIGS. 1–12, wherein like numbers indicate the same or corresponding elements throughout the views. Turning to FIG. 1, an embodiment of an illuminated control assembly 22 according to the present invention is generally shown in conjunction with a motorcycle 16. Illuminated control assembly 22 might also be suitable for association with any other motor vehicle, including but not limited to automobiles, trucks, mopeds, bicycles, scooters, wheelchairs, airplanes, helicopters, gliders, personal watercraft, boats, golf carts, snowmobiles, tractors, and all-terrain vehicles. Furthermore, illuminated control assembly 22 can also be configured for use with industrial, electrical and/or mechanical equipment that would not be considered motor vehicles but that nevertheless entail one or more control devices or control assembly arrangements that could benefit from selective illumination. Examples of such equipment might include but are not limited to generators, chainsaws, pressure washers, pumps, fans, trimmers, air conditioners, compressors, lawnmowers, soundboards, power plant controls, instrument panels, machine operator stations and heavy equipment controls.

Figure 2:
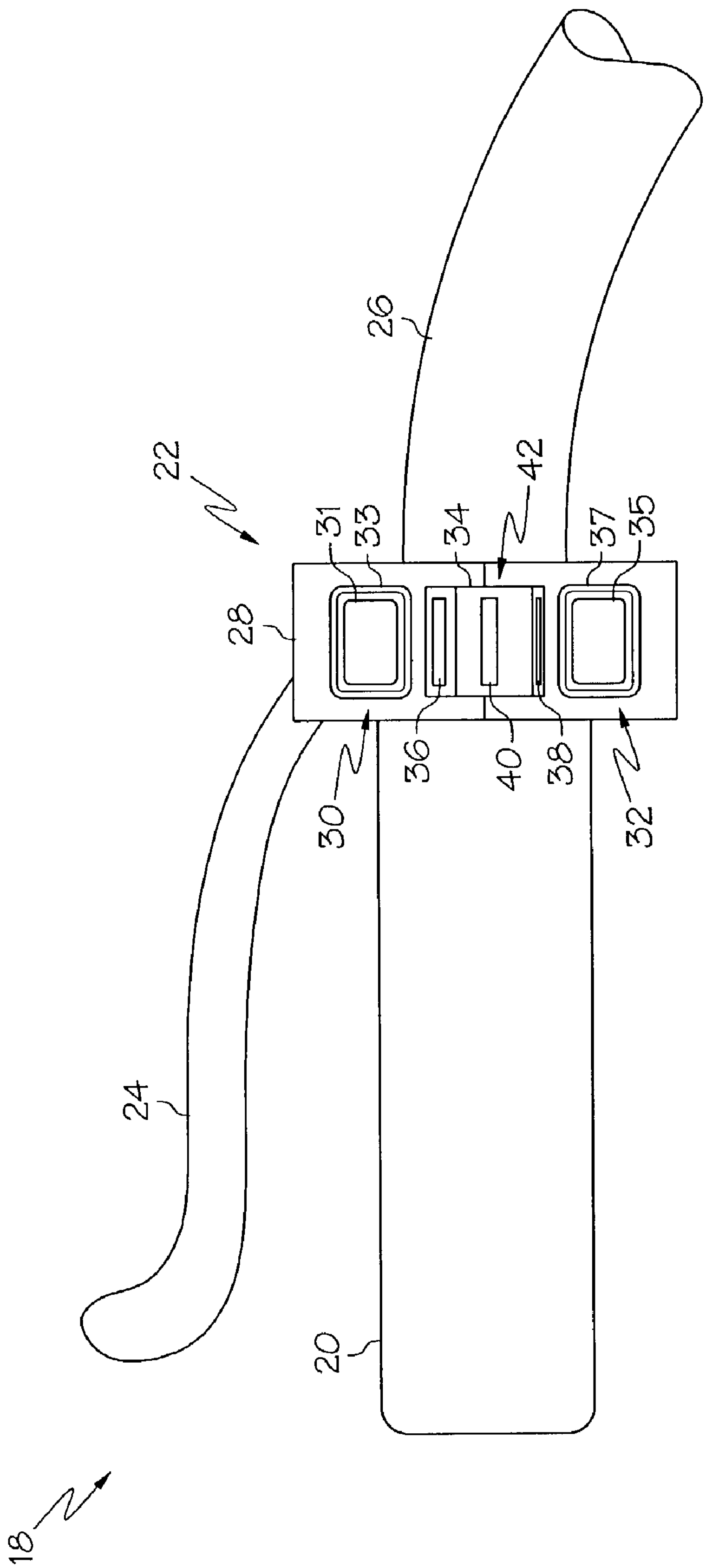
FIG. 2 is an enlarged partial top plan view depicting the illuminated control assembly on a handlebar of the motorcycle of FIG. 1.

As illustrated in FIGS. 1 and 2, when associated with a motorcycle, for example, illuminated control assembly 22 might advantageously be disposed near the grip 20 on a handlebar 18. Handlebar 18 may comprise a tube 26 upon which grip 20 and a brake lever 24 can be disposed. In one embodiment, an illuminated control assembly 22 can be associated with handlebar 18 near grip 20. Illuminated control assembly 22 might even be integrally formed with tube 26 and/or grip 20. For example, grip and illuminated control assembly can be jointly formed in a common injection molding process, for example. In still another embodiment, illuminated control assembly 22 can be separate and spaced from grip 20. Such embodiments may involve illuminated control assembly 22 connected to handlebar 18 at a location separate from grip 20, such as near the center of the motorcycle (e.g., near the location typical for a speedometer and/or tachometer). Alternatively, illuminated control assembly 22 can be associated with non-handlebar locations on the motorcycle, including but not limited to a body panel or instrument cluster. These various placement options are equally relevant to other equipment having handlebars, including but not limited to all terrain vehicles, mopeds, bicycles, personal watercraft, and snowmobiles.

Regardless of the type of associated equipment, illuminated control assembly 22 can be disposed at any location upon which its control devices can be visually accessed by an operator. For example, with regard to an automobile or a boat, illuminated control assembly 22 can be associated with the dashboard, a door panel, an engine compartment, a steering wheel, a glove compartment, a trunk, or any other accessible location for control devices. When associated with a generator, for example, illuminated control assembly 22 can be affixed to a surface of the generator accessible to an operator, such as a location near the power outlets. In other embodiments, illuminated control assembly 22 can be configured as a handheld or remote device for association with a piece of controlled equipment.

Figure 3:
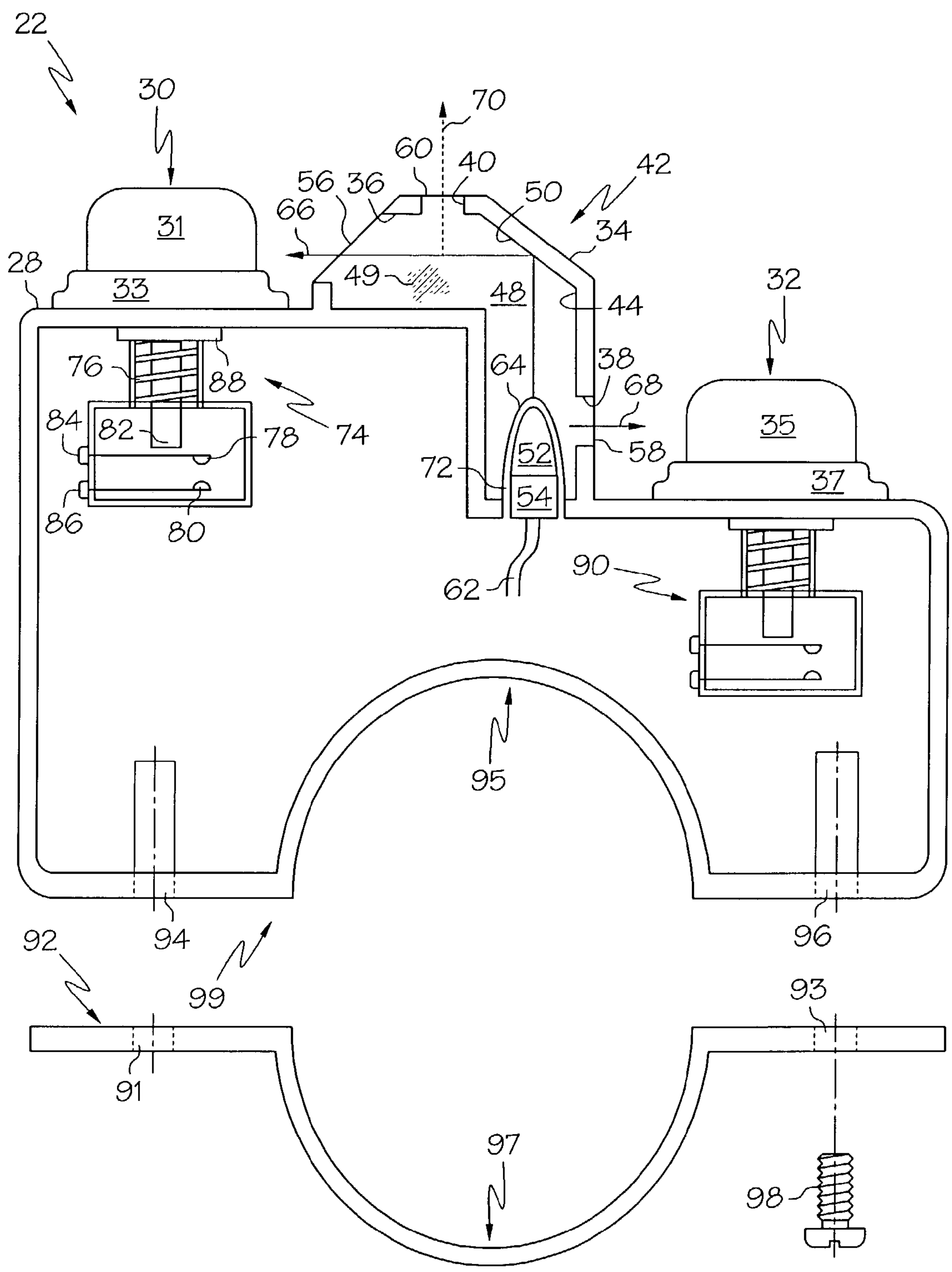
FIG. 3 is an enlarged partially exploded cross-sectional view depicting details of exemplary components of an illuminated control assembly such as depicted in FIGS. 1 and 2.

As shown in FIG. 2, illuminated control assembly 22 can comprise an enclosure 28. Enclosure 28 can be formed from any suitable material, including, for example, steel, aluminum, plastic, rubber, epoxy, a combination thereof, or a composite material. Furthermore, enclosure 28 can assume any shape that can associate a light distribution plenum 42 in accordance with the present invention with first and second control devices to be illuminated. For example, as shown in FIGS. 2–3, enclosure 28 can be configured to mount upon a substantially round tube (e.g., tube 26 of handlebar 18). Particularly, enclosure 28 might be mounted by disposing tube 26 between an interior formation 95 and an exterior formation 97, whereby clamp 92 can then be moved adjacent to mounting surface 99. Bolts or other fasteners (e.g., bolt 98) can then be inserted through fastening holes 91 and 93 and into respective mounting apertures 94 and 96 so as to maintain clamp 92 adjacent to mounting surface 99 of enclosure 28, thereby establishing a firm connection between illuminated control assembly 22 and tube 26. In this manner, enclosure 28 can be readily mounted to a handlebar of a motorcycle, moped, all terrain vehicle, snowmobile, personal watercraft, bicycle or other device, as appropriate. It is to be understood that the mounting surface can assume a variety of alternate configurations not depicted herein to facilitate mounting of enclosure 28 in a location for convenient access and visualization by the user. For example, in the motorcycle application, mounting surface 99 might engage handlebar 18 without clamp 92, whereby mounting surface 99 can fasten directly to handlebar 18 with chemical adhesives, welding, connectors, or fasteners (e.g., screws).

Figure 4:
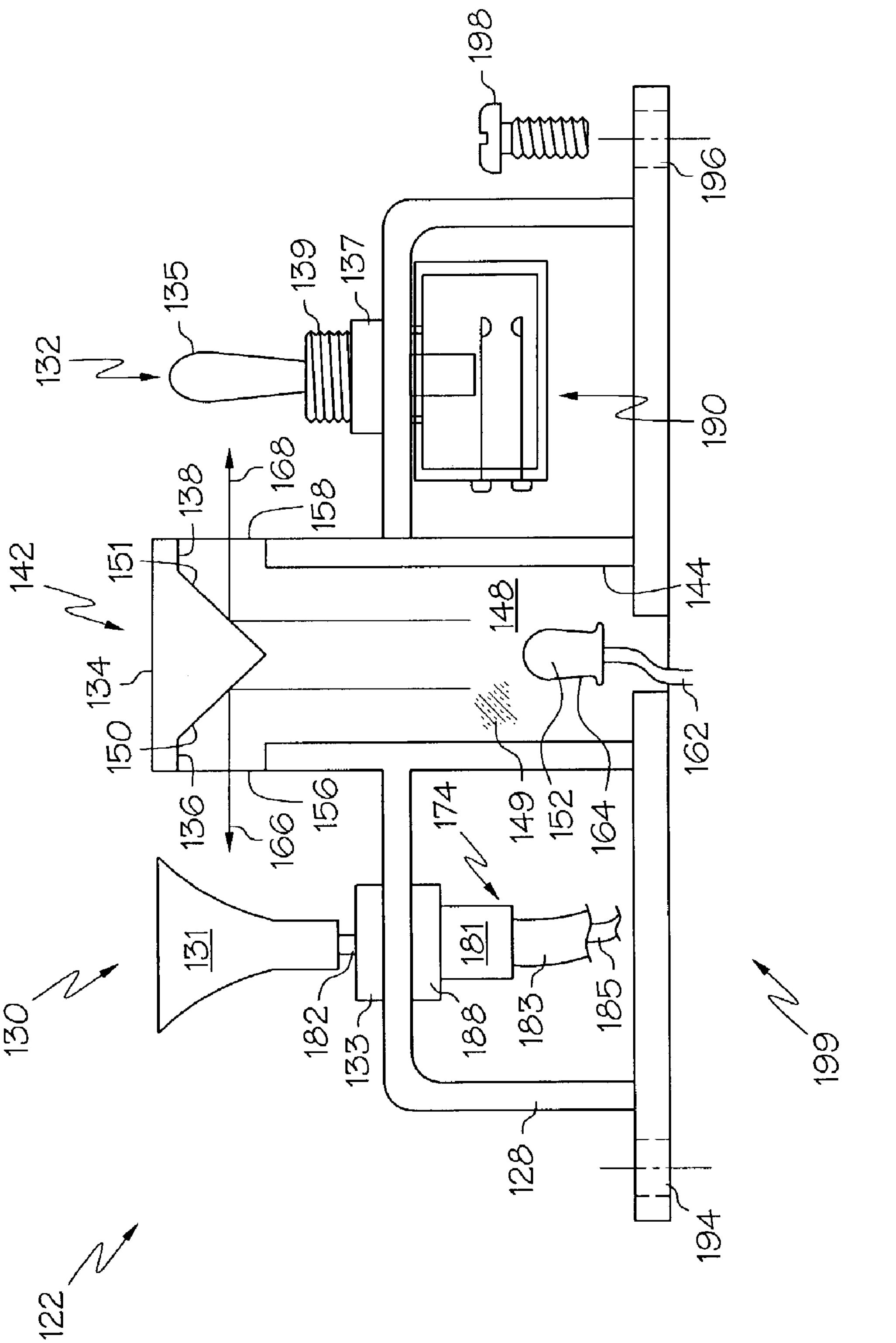
FIG. 4 is an enlarged cross-sectional view of an illuminated control assembly in accordance with another exemplary embodiment of the present invention.

In another embodiment, as shown in FIG. 4, for example, enclosure 128 can include a substantially flat mounting surface 199 having mounting apertures 194 and 196. An enclosure having such a substantially flat mounting surface 199 can be suitable for association with a nearly endless variety of equipment, particularly equipment having or associated with a substantially flat surface. Hence, enclosure 128 can be attached to a wall, bulkhead, dashboard, door, or another suitably flat surface by insertion of fasteners (e.g., screw 198) into apertures 194 and 196. Alternatively, adhesive tape, rivets, chemical adhesives, and/or welding may be used to facilitate this attachment. In still further embodiments, an enclosure can include alternate mounting surfaces configured to interface with virtually any type of associated equipment. Regardless of the mounting configuration of the enclosure, the enclosure can be configured to be water resistant or waterproof, so as to prevent moisture from penetrating the optics, switch mechanisms and other components not accessible to the operator.

An enclosure can be configured to support a first control device and a second control device. Although first and second control devices 30 and 32 are both depicted in FIG. 2 as pushbuttons, in another exemplary embodiment, a first control device can be a different type of control device than a second control device. For example, a first control device can comprise a pushbutton wherein a second control device might comprise a toggle switch. Alternatively, a first control device might comprise a mechanical actuator (e.g., a throttle lever), wherein a second control device might comprise an indicator gauge (e.g., a fuel gauge). Suitable control devices for use in conjunction with an exemplary enclosure might include, but are not limited to, pushbuttons, switches, gauges, mechanical actuators, indicator lights, levers, slide switches, rocker switches, toggle switches, key switches, fluid level indicators, rotary knobs, valves and LCD displays.

The control devices can also be associated with the enclosure in a variety of configurations, depending primarily upon the type of control devices and the specific configuration of the enclosure. For example, a control device can be attached to the enclosure with connectors or other fasteners (e.g., as is second control device 132 in FIG. 4). In another example, a control device can be formed at least partially integrally with the enclosure (e.g., cap receiver 33 can be jointly formed with enclosure 28 in FIG. 3). Alternatively, a control device can be configured to "snap" into place within one or more apertures in the enclosure. Such "snap" mounting is common for certain rocker switches and indicator lights, for example. In still a further alterative, control devices can be glued or otherwise bonded, with or without adhesive, to the enclosure. Such bonding can be achieved through use of double-sided tape and/or silicone, for example.

As shown in FIG. 3, for example, first control device 30 can comprise a pushbutton having a cap 31 configured for depression by an operator's hand or finger. Cap receiver 33 can be adjacent to enclosure 28 for reciprocatingly receiving cap 31 as selectively depressed by an operator. In an exemplary embodiment, cap 31 and cap receiver 33 can be configured such that ambient water (e.g., rain) cannot penetrate enclosure 28 through first control device 30. First control device 30 can be held in place with respect to enclosure 28 by a fastener 88 attached (such as by threads) to a correspondingly threaded portion or extension (not shown) of cap receiver 33. Fastener 88 might comprise, for example, a nut, snap ring, adhesive, or another suitable fastener. In some embodiments, at least a portion of first control device 30, such as cap receiver 33 and/or fastener 88, can be formed integrally with or attached to enclosure 28.

When cap 31 is depressed by an operator, plunger 82 can move downward into the pushbutton mechanism 74, which can include a spring 76 to normally bias cap 31 in an upward position. When plunger 82 moves downwardly, contact 78 engages contact 80 resulting in conductance between associated terminals 84 and 86. Terminals 84 and 86 can be connected to the electrical system of the associated piece of equipment (e.g., a motorcycle's computer). In the embodiment as shown in FIG. 3, wherein both first control device 30 and second control device 32 comprise pushbuttons, the pushbutton mechanism 90 associated with second control device 32 can be similar or identical to pushbutton mechanism 74 associated with first control device 30. Likewise, in this same embodiment, cap 35 and cap receiver 37 associated with control device 32 can also be similar to cap 31 and cap receiver 33 associated with first control device 30. However, it is to be understood, that pushbutton mechanisms 74 and 90 are exemplary, and that a wide variety of alternate mechanisms may be equally employable.

An illuminated control assembly in accordance with the present invention comprises, among other features, at least one light distribution plenum. As used herein, a plenum is any device, assembly or arrangement for receiving light from a light source and for distributing at least portions of that light in two or more directions as desired. This plenum or light distribution device might also be utilized to manipulate the received light, or to house or partially house other elements that manipulate such light, for subsequent distribution among directions and control devices as desired. For example, as depicted in FIG. 3, plenum 42 can receive light from light source 52 and can direct portions (e.g., 66, 68) of light to first and second control devices 30 and 32, respectively. As further shown in this example, plenum 42 can be integral with enclosure 28 adjacent to and between two or more control devices 30, 32 that are also associated with enclosure 28. However, in an alternate embodiment, plenum 42 might be disposed adjacent to first control device 30 and second control device 32 even though a common enclosure may not be present. For example, a plenum associated with a first enclosure might illuminate first and second control devices even though first and second control devices may not be associated with the first enclosure.

The control devices to be illuminated are effectively spaced or otherwise located remote from the plenum as needed or desired in a particular control scheme. By "spaced from" or "remote from," it is to be understood that there is some physical distance between an optical avenue of the plenum and an associated control device to be at least partially illuminated by light emanating through the optical avenue. In an exemplary embodiment, this physical distance might comprise the atmosphere (e.g., air or water) such that light emitted from an optical avenue of the plenum can travel through the atmosphere toward the control device. In another embodiment, a flexible boot (not shown) or other conduit might fasten to a control device and/or to the plenum in order that light from an optical avenue might be partially or fully enclosed as it travels to illuminate the control device. Although implementation of such a boot might undermine any cost savings or simplicity of an exemplary plenum, the boot may nevertheless be desirable in certain circumstances. Regardless of whether such a boot or other conduit is provided, it should be understood that the plenum is spaced from or remote from the control device for purposes of the present invention.

As depicted in FIGS. 2 and 3, plenum 42 can comprise a shell 34 formed from any opaque material(s) that is/are capable of at least partially blocking the passage of light. Examples of such materials might include select plastics, resins, epoxy, rubber, metals, composites, and a host of other materials. In an exemplary embodiment of the present invention, the shell can be formed from black or other suitably opaque epoxy plastic. In still another example, the shell can comprise opaque paint or other coatings. Although typically the shell can be configured to be completely opaque, in some embodiments of the present invention, at least part of the shell can be somewhat transparent or translucent. In certain embodiments, the shell might be integrally formed with the enclosure, such as during a single injection molding process. Shell 34 is illustrated with an interior surface 44 substantially defining a cavity 48. Although in one embodiment, cavity 48 can comprise space open to the atmosphere, cavity 48 might alternatively be at least partially separated from the atmosphere (e.g., by shell 34 and/or other components of plenum 42).

One or more selective optics might be associated with a plenum of the present invention, such as in any of a variety of configurations as discussed more fully hereinafter. A selective optic is an optic that is capable of orienting or otherwise manipulating illumination from a light source and the plenum to one or more control devices in a predetermined or selected manner. More particularly, a selective optic can include any device or combination of devices configured to, for example, selectively direct, reflect, enhance, magnify, focus, disperse, collimate, split, or otherwise condition or manipulate light from a light source to illuminate at least a portion of one or more control devices. Examples of selective optics include but are not limited to reflective surfaces, achromatic lenses, condenser lenses, cylinder lenses, double-concave lenses, double-convex lenses, meniscus lenses, plano-concave lenses, plano-convex lenses, all purpose prisms, penta prisms, porro prisms, right-angle prisms, wedge prisms, flat-surface mirrors, concave mirrors, convex mirrors, windows, filters, gases (e.g., nitrogen, halogen, argon, mercury vapor, and/or xenon), beam splitters, plenum inserts (e.g., 49), and polarizers. In an exemplary embodiment, a selective optic is disposed at least partially within the plenum and is configured to direct light from a light source toward one or more control devices external to and spaced from the plenum.

In some embodiments, as shown in FIG. 3, for example, plenum 42 comprises a plenum insert 49. Plenum insert 49 can be formed from clear or colored plastic and/or glass (e.g., a fiber optic), can be disposed at least partially within cavity 48, and can be configured to fill at least part of cavity 48. In an exemplary embodiment of the present invention, plenum insert 49 might substantially fill cavity 48 with clear polycarbonate to assist in directing light to one or more control devices adjacent to plenum 42. Additional selective optics can also be associated with or embedded within plenum insert 49. For example, a plenum insert might comprise one or more lenses embedded within clear plastic. As another example, a plenum insert may be configured adjacent to a window associated with an optical avenue.

A light source 52 can be configured to direct light into a receptor 64 of plenum 42. A receptor can comprise any window, optical avenue, opening, or void in shell 34 specifically configured to receive light into a cavity from a light source. A receptor might further comprise any selective optic(s) through which this light might pass as it enters the cavity. In an embodiment wherein a light source is disposed entirely outside of the cavity, a receptor (e.g., an opening in shell) can be configured to receive light from the light source and to direct the light into the cavity. In an embodiment wherein the light source is partially or fully inserted into the cavity, the receptor can comprise, for example, an optical avenue or other effective opening through which the light source is inserted, the portion of the cavity abutting the light source, and/or a recess or void within a plenum insert within the cavity. For example, as shown in FIG. 3, a receptor 64 can comprise a void or a recess within a plenum insert 49 disposed within cavity 48. Light source 52 might be partially or fully inserted into this recess within plenum insert 49 and may be spaced from the recess by a gap 72. Gap 72 can be sized appropriately to enable some of the heat generated by light source 52 to escape before being absorbed by plenum insert 49, for example. Furthermore, gap 72 might also better facilitate the insertion of light source 52 into plenum insert 49.

Light source 52 can comprise an incandescent light bulb, a Light-Emitting Diode ("LED"), a fluorescent light source, a high intensity discharge lamp, a laser, or another suitable electrical device configured to generate unidirectional or multidirectional light. Alternatively, a light source can include a non-electrical source of light. For example, the light source can include radium, tritium, or another such radioactive material. As another example, the light source can include chemical luminescent material. In still a further example, the light source could be a gas-fired lamp, such as a lantern or other device having a flame. As still another alternative, a light source might substantially fill the entire cavity, such as would be the case if the cavity were filled with a gas and electrodes were inserted into the cavity and configured to stimulate the gas (e.g., as in a fluorescent or xenon light bulb). In those instances in which light source 52 comprises an electrical device, such as an incandescent lamp or LED, light source 52 can receive power through a wire 62 connected to light source 52 with a connector 54, for example. The other end of wire 62 can then be connected directly or indirectly (e.g., such as through a switch and/or fuse block) to a source of electrical power, such as an alternator, generator, battery, or other device containing or generating electrical power. In one exemplary embodiment of the present invention, light source 52 can include one or more incandescent light bulb(s) or LED(s) configured to receive power from a battery through wire 62. Light source 52 can be configured to emit light having any color or combination of colors into cavity 48.

Figure 11:
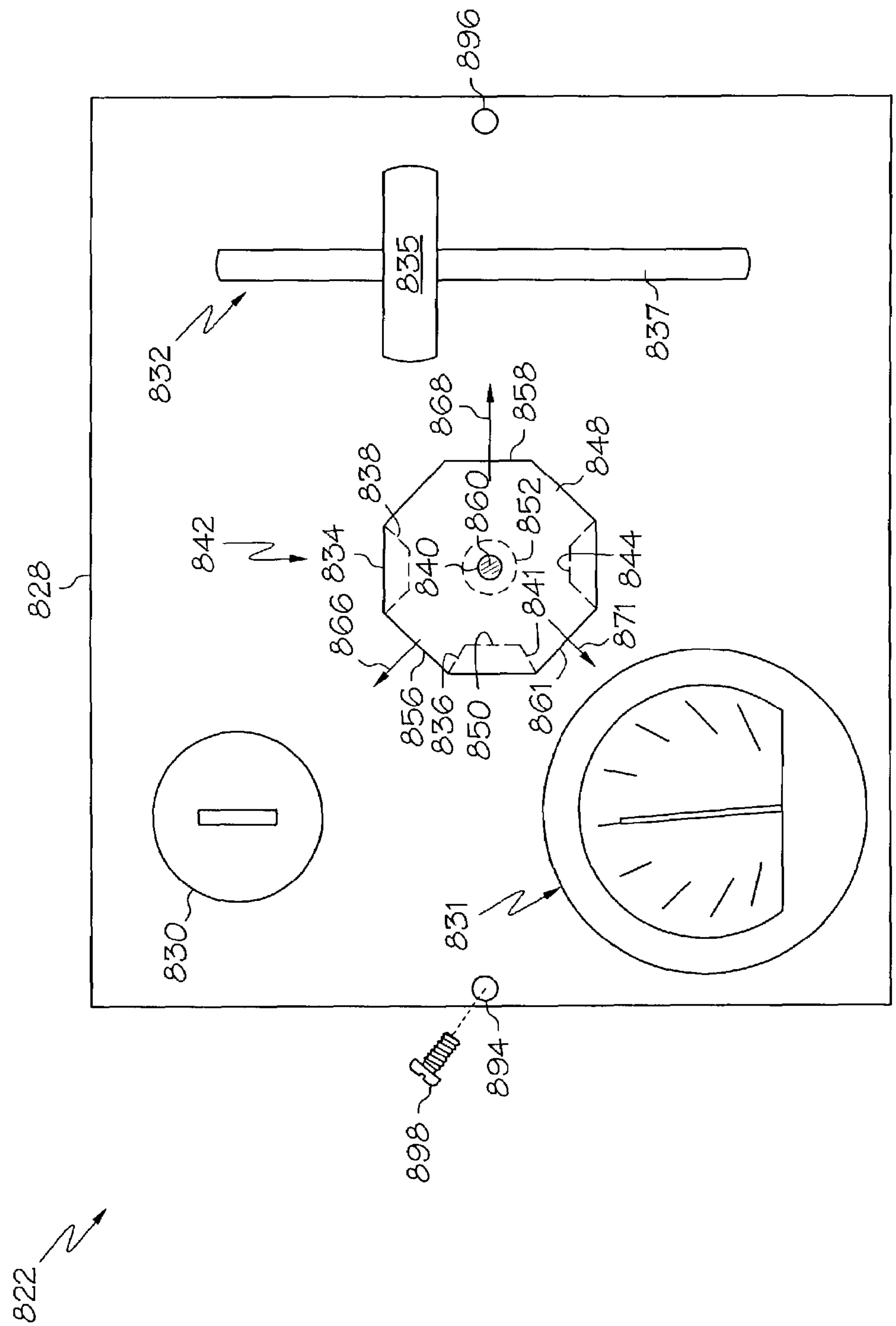
FIG. 11 is a top plan view depicting another exemplary embodiment of an illuminated control assembly in accordance with the present invention.

One or more optical avenues 36, 38 and 40 can be disposed within shell 34 of plenum 42. Optical avenues can involve any opening, window, or other void in shell 34 that can facilitate the passage of light. Exemplary embodiments of the present invention could include virtually any number of optical avenues having virtually any configuration. The particular location, orientation and/or configuration of optical avenues with respect to a plenum can be generally selected to best correspond with the types of associated control devices and the specific orientation of the plenum with respect to the control devices. For example, optical avenues can be disposed on different sides of the plenum and can be oriented in different directions. In some instances, such as shown in FIGS. 3 and 4, for example, first and second optical avenues 36 and 38, 136 and 138 can be oriented in opposite directions (e.g., so as to emit portions of light 180 degrees separated). In other instances, such as shown in FIG. 11, first and fourth optical avenues 836 and 841 can be oriented in a direction somewhat adjacent (e.g., so as to emit light about 90 degrees separated). However, it is to be understood that the relative orientation of optical avenues can assume any angle ranging from 0–360 degrees. Regardless of the directional orientation of a plenum's optical avenues, each optical avenue can be entirely separate and distinct from every other optical avenue, such that each optical avenue is spaced from every other optical avenue. Hence, optical avenues of a given plenum may be non-contiguous and non-adjacent with respect to one another. In one embodiment, different optical avenues can be spaced or separated by portion(s) of the shell, for example. In another embodiment, however, different optical avenues might be effectively spaced or separated by a connection between two different surfaces of a single element such as a polygon-shaped material (e.g., a plenum insert formed from polycarbonate).

As another example, the height or level of an optical avenue (e.g., measured from the light source) can vary from that of other optical avenues within a given plenum, as shown by optical avenues 36 and 38 in FIG. 3, for example. However, as illustrated in FIG. 4, for example, multiple optical avenues 136 and 138 can be disposed at approximately the same height or level with respect to each other (also shown by optical avenues 836, 838 and 841 of FIG. 11). In an exemplary embodiment, regardless of the directional orientation and level of two optical avenues within a plenum, the distance of a control device from the light source might differ from the distance between another control device and the same light source. Furthermore, the distance between an optical avenue and its associated control device might differ from the distance between another optical avenue of the same illuminated control assembly and its associated control device. In other embodiments, any of these directional orientations, heights, levels and/or distances might be uniform among some or all optical avenues and control devices of a given plenum. In any event, the specific configuration of each optical avenue within a plenum can be selected such that light from the light source effectively illuminates the associated control device(s).

The specific intensity and optical configuration of light emitted from an optical avenue of the plenum can depend upon, for example, the type and configuration of the light source, the shape and configuration of the shell and cavity, and the type(s) and configuration(s) of selective optic(s) within and/or associated with the plenum. An exemplary plenum in accordance with the present invention can be configured to provide a substantially equal amount of light from each optical avenue, as might be beneficial, for example, to illuminate multiple similarly configured control devices. However, an exemplary plenum could alternatively be configured to provide different amounts of light from each optical avenue when, for example, multiple control devices having different configurations are effectively illuminated.

One or more selective optics can also be associated with one or more optical avenues in a particular plenum. For example, a selective optic associated with an optical avenue might comprise, for example, a lens, a window, a prism, or a plenum insert (e.g., 49). Such selective optics associated with optical avenues can assist in directing and managing light from within the cavity to the control devices. Such direction and management can, for example, include bending, dispersing, focusing, directing or otherwise causing light from a light source to effectively illuminate a control device. In addition, such selective optics can be further configured to prevent dirt and/or moisture from entering cavity 48 and/or to prevent gas from escaping cavity 48. For example, one or more selective optics may be associated with each optical avenue of a plenum so as to prevent gaseous, solid and/or liquid matter from entering or exiting the cavity. Selective optics can further be configured to enhance the aesthetic properties of a plenum, such as by filling voids or openings in a shell corresponding to certain optical avenues. However, in some circumstances, no selective optic may be associated with a particular optical avenue. Although FIGS. 3–12 depict exemplary plenums having exemplary configurations of optical avenues and/or selective optics, it is to be understood that hundreds of additional configurations might also be available that effectively and selectively illuminate associated control devices as needed.

As shown in FIG. 3, for example, plenum 42 can include a first optical avenue 36, a second optical avenue 38, and a third optical avenue 40. First optical avenue 36 is shown in this example as being located generally adjacent to first control device 30, while second optical avenue 38 is generally adjacent to second control device 32. Moreover, first optical avenue 36 and second optical avenue 38 are illustrated as being disposed upon opposite sides of plenum 42 and at different heights. In addition, plenum 42 is shown with a third optical avenue 40 generally directed toward an operator of illuminated control assembly 22 (e.g., the driver of the motorcycle). Furthermore, in this example, selective optics 56, 58 and 60 are associated with optical avenues 36, 38 and 40, respectively, and each comprise a respective portion of plenum insert 49. In this example, a first portion of light 66 generated by light source 52 will be reflected by selective optic 50 and out through first optical avenue 36 to illuminate at least part of first control device 30. In this manner, the entire portion of light 66 emitted from first optical avenue 36 can be indirect light, such as when none of the light 66 passes in a straight line (e.g., directly) from light source 52 to first control device 30. In another embodiment, both direct and indirect light might pass through first optical avenue 36 to illuminate first control device 30. To facilitate and ensure the passage of indirect light through first optical avenue 36, selective optic 50 can comprise a reflective surface including but not limited to a polished interior surface 44, a mirror disposed within cavity 48, and/or clear plastic (e.g., plenum insert 49) within cavity 48 polished or coated with a reflective material. A selective optic 56 can optionally be associated with first optical avenue 36 and can comprise, for example, a surface of plenum insert 49.

A second portion of light 68 can pass through second optical avenue 38 directly from light source 52 to illuminate at least part of second control device 32. Some indirect light (e.g., reflected from interior surface 44) might also pass through second optical avenue 38 to illuminate at least part of second control device 32. A selective optic 58 can be associated with second optical avenue 38 and can comprise, for example, a surface of plenum insert 49. In this configuration, first and second optical avenues 36 and 38 can illuminate two control devices 30 and 32 disposed at different heights and in different directions, as shown in FIG. 3, for example. In an exemplary embodiment, first and second optical avenues 36 and 38 can be oriented such that most of the emitted light is directed to control devices 30 and 32, thereby avoiding direction of extraneous glare-causing light toward the driver.

Furthermore, a third portion of light 70 from light source 52 can pass through third optical avenue 40. Again, a selective optic 60 (e.g., a portion of plenum insert 49) can be associated with third optical avenue 40. Although some portion of light 70 can pass directly to the operator from light source 52, some of the light 70 can pass indirectly to the operator after being reflected or otherwise enhanced by one or more selective optics disposed within or associated with plenum 42. By looking at third optical avenue 40, a driver can notice light 70 and therefore discern the operational status of light source 52. The effective opening in shell 34 corresponding to third optical avenue 40 can be sized, located and oriented in order to effectively reduce glare to a driver. In addition, selective optic 60 associated with third optical avenue 40 can be sized, located, oriented and/or coated to limit the amount of glare caused by light 70. By reducing the amount of light wasted to glare in this manner, a smaller and more energy efficient light source can be implemented to illuminate the control devices.

FIG. 4 depicts an alternate illuminated control assembly 122 in accordance with one embodiment of the present invention. Illuminated control assembly 122 can include an enclosure 128 having a first control device 130, a second control device 132, and a light distribution plenum 142. The first control device 130 is illustrated as comprising a mechanical actuator, such as for interfacing a choke or throttle cable. The mechanical actuator might include a knob 131 operatively connected to a plunger 182, whereby plunger 182 can pass through mounting flange 133 and fastener 188 into a mechanical actuator mechanism 174. Mechanical actuator mechanism 174 can include a connector 181 that fastens plunger 182 to a cable (e.g., 185) disposed within cable channel 183. The second control device 132 is shown as comprising a toggle switch having a handle 135 operatively connected to a switch mechanism 190 through a threaded neck 139. A nut 137 can be placed upon the threaded neck 139 to hold the switch in place within enclosure 128. As depicted in FIG. 4, first and second control devices 130 and 132 can be positioned on opposite sides of plenum 142 and at approximately the same height or level.

Plenum 142 of this example includes a shell 134 with an interior surface 144 substantially defining a cavity 148. As illustrated in FIG. 4, cavity 148 is substantially filled with plenum insert 149 formed, for example, from clear plastic. As further illustrated, a light source 152, such as an LED, can be molded within a receptor 164 portion of plenum insert 149 and can receive power through a wire 162. As further depicted, light source 152 can generate a portion of light 166 that can reflect from selective optic 150 through first optical avenue 136 to indirectly illuminate first control device 130. Light source 152 might also provide some amount of direct light to illuminate first control device 130 (e.g., if a straight path exists through cavity 148 from light source 152 to first optical avenue 136). Also depicted, a second portion of light 168 can be reflected from selective optic 151 through second optical avenue 138 thereby indirectly illuminating second control device 132. Light source 152 might also provide some amount of direct light to illuminate second control device 132 (e.g., if a straight path exists through cavity 148 from light source 152 to second optical avenue 138).

To facilitate the passage of indirect light through first and second optical avenues 136 and 138, selective optics 150 and 151 in this arrangement might each respectively comprise a reflective surface including but not limited to a polished interior surface 144, a mirror disposed within cavity 148, and/or plenum insert 149 polished or coated with a reflective material. Selective optics 156 and 158 can also be associated with first and second optical avenues 136 and 138, respectively, and are depicted in FIG. 4 as portions of plenum insert 149. In this manner, plenum 142 can illuminate two control devices of different types that are adjacent to and at predetermined (in this example equal) heights on opposite sides of plenum 142.

Figure 5:
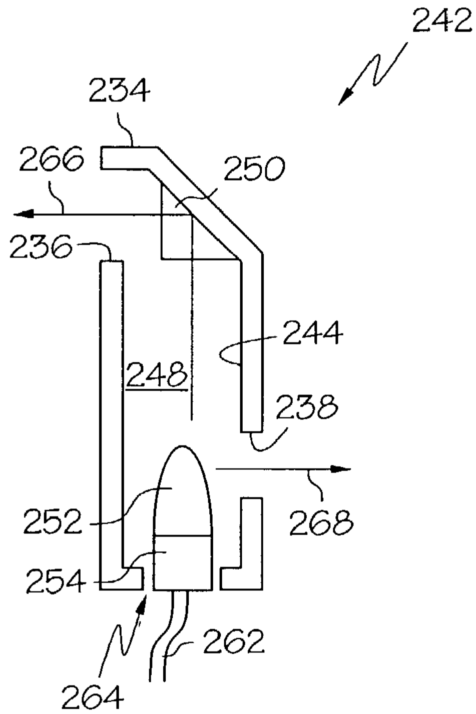
FIG. 5 is an enlarged cross-sectional view depicting another exemplary embodiment of a light distribution plenum in accordance with the present invention.

FIG. 5 depicts an alternate embodiment of a light distribution plenum 242 and light source assembly in accordance with one embodiment of the present invention. Plenum 242 can include a shell 234 having an interior surface 244 substantially defining a cavity 248. As shown in FIG. 5, for example, cavity 248 might be open to the ambient air. A light source 252 can be disposed at least partially within cavity 248 by insertion through a receptor 264. Receptor 264 is shown in FIG. 5 as an opening in shell 234 through which light source 252 is inserted. Light source 252 can be supplied with power by means of a wire 262 fastened with connector 254, for example. In this example, a first portion of light 266 would be emitted by light source 252 and reflected by selective optic 250 and then out through first optical avenue 236 to illuminate a first control device. In some embodiments, all of the light passed through first optical avenue 236 to the first control device can be indirect light from light source 252, having been reflected by selective optic 250. However, a portion of that light passed through first optical avenue 236 might also be directly passed from light source 252, depending upon the size, light source location and precise configuration of plenum 242.

As further depicted in FIG. 5, selective optic 250 can comprise a prism, for example. In other embodiments, selective optic 250 could comprise a mirror, a polished interior surface 244, and/or a reflective coating on interior surface 244. In addition, a second portion of light 268 can be emitted by light source 252 directly through a second optical avenue 238 in order to illuminate a second control device. Although the second optical avenue 238 can primarily pass direct light from light source 252 to the second control device, some indirect light (e.g., as reflected from interior surface 244) might also be passed through second optical avenue 238. In this manner, plenum 242 can illuminate two control devices oppositely positioned and at two respective heights or distances from light source 252.

Figure 6:
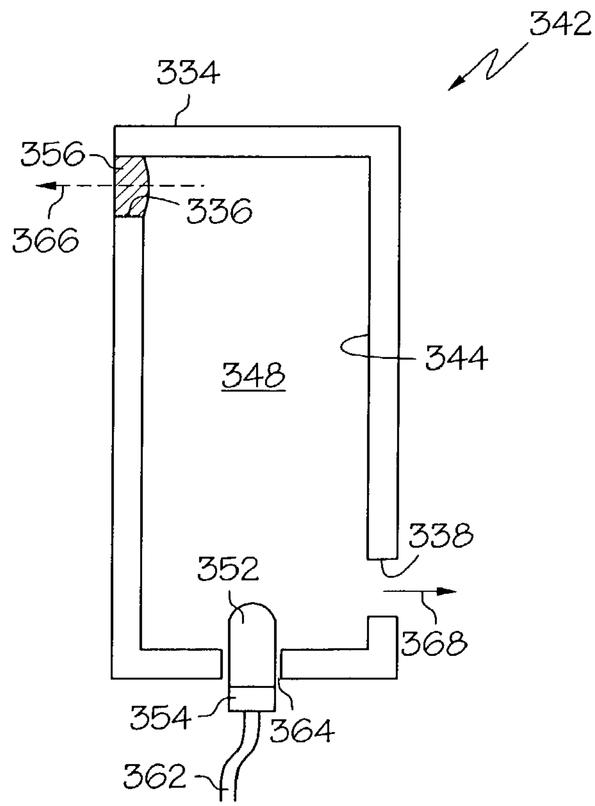
FIG. 6 is an enlarged cross-sectional view depicting yet another exemplary embodiment of a plenum in accordance with the present invention.

FIG. 6 depicts yet another exemplary embodiment of a plenum 342 in accordance with one embodiment of the present invention. Plenum 342 comprises a shell 334 having an interior surface 344 substantially defining a cavity 348. In this example, cavity 348 is open to the ambient air. A light source 352 can be disposed at least partially within a receptor 364 that is configured to facilitate insertion of light source 352 through shell 334 and into cavity 348. Light source 352 can receive power via a wire 362 attached with a connector 354. A portion of light 366 can be configured to escape through a first optical avenue 336 in plenum 342. As shown in the embodiment of FIG. 6, first optical avenue 336 includes a selective optic 356 (e.g., a lens) configured to alter, direct, condition or otherwise manipulate the light passing from light source 352 to a first control device. As further shown, substantially no portion of light 366 can pass directly through first optical avenue 336 from light source 352 (e.g., because no effective straight line through cavity 348 exists between light source 352 and first optical avenue 336). Rather, a portion of light 366 can reflect or otherwise be manipulated by at least one selective optic within or associated with plenum 342. For example, light source 352 emits light that can reflect (likely multiple times) upon interior surface 344, whereby this reflected light can pass through first optical avenue 336 to effectively illuminate a first control device. In addition, second portion of light 368 can pass substantially directly from light source 352 to illuminate a second control device.

Figure 7:
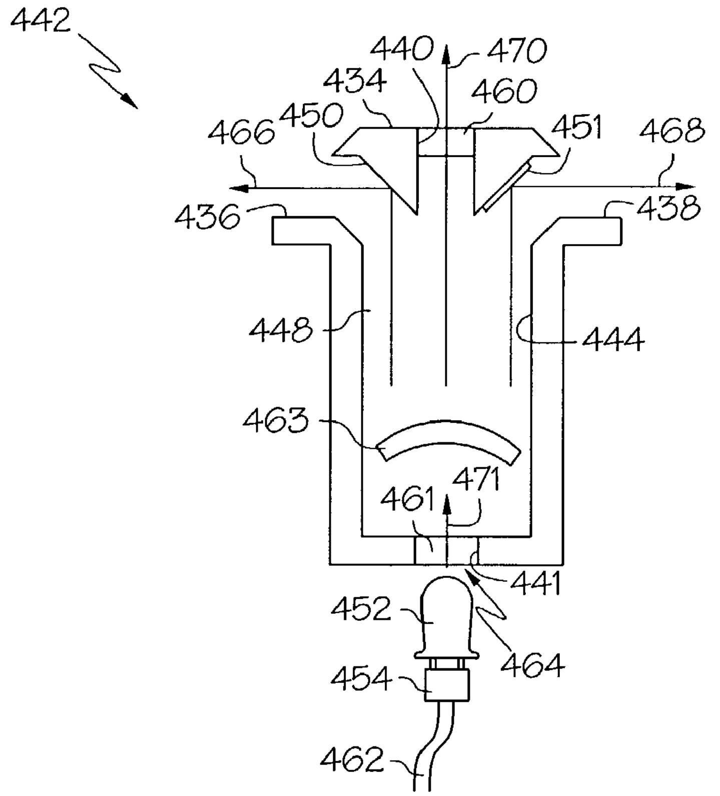
FIG. 7 is an enlarged cross-sectional view of still another exemplary embodiment of a plenum in accordance with the present invention.

Turning now to FIG. 7, a light distribution plenum 442 is disclosed as having a shell 434 having an interior surface 444 substantially defining a cavity 448. As depicted, cavity 448 can be open to ambient air, and might further include one or more selective optics 451, 460, 461 and 463. A light source 452 (e.g., an LED) can be disposed external to shell 434 and cavity 448 and can be configured such that light source 452 emits light 471 into receptor 464. Receptor 464 might comprise a selective optic 461 (e.g., a window) optionally associated with fourth optical avenue 441 and configured to introduce light 471 to cavity 448. Light source 452 receives electrical power through a wire 462 fastened with a connector 454. In this example, upon entering cavity 448, light 471 passes through selective optic 463 (e.g., a lens) and is then emitted from plenum 442 as a first portion of light 466, a second portion of light 468, and a third portion of light 470. The first portion of light 466 is reflected by a selective optic 450 (e.g., a reflective coating on interior surface 444) through a first optical avenue 436, wherein this first portion of light 466 would illuminate a first control device adjacent to plenum 442. A second portion of light 468 is reflected by selective optic 451 (e.g., a mirror) through second optical avenue 438, wherein second portion of light 468 would illuminate a second control device adjacent to plenum 442. A third portion of light 470 can pass directly to an operator from selective optic 463 through selective optic 460 (e.g., a diffuser) associated with third optical avenue 440.

Figure 8:
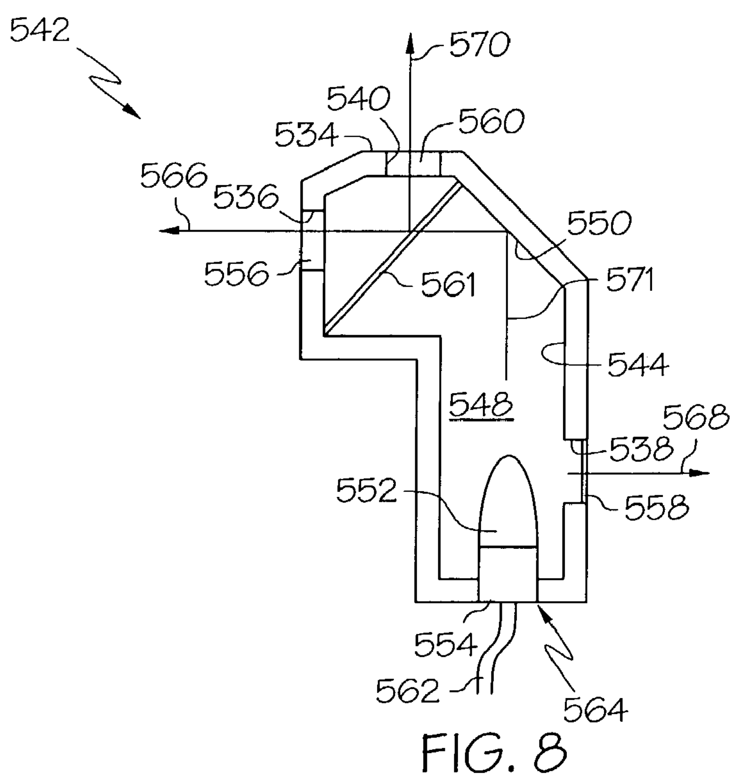
FIG. 8 is an enlarged cross-sectional view depicting still another exemplary embodiment of a plenum in accordance with the present invention.

FIG. 8 depicts yet another plenum 542 in accordance with one embodiment of the present invention. Plenum 542 can include a shell 534 having an interior surface 544 substantially defining a cavity 548. In this example, cavity 548 can comprise open air, for example, that can be substantially sealed from the atmosphere by selective optics 556, 558 and 560. A light source 552 can be inserted into cavity 548 through a receptor 564 formed, for example, within shell 534. Light source 552 can receive electrical power through wire 562 fastened to light source 552 with connector 554. A portion of light 571 from light source 552 can be reflected by a selective optic 550 (e.g., a reflective coating on interior surface 544) and can then be split by a further selective optic 561 (e.g., a splitter). When portion of light 571 is split by selective optic 561, a portion of light 566 can escape cavity 548 through a selective optic 556 (e.g., a lens) associated with a first optical avenue 536. Another portion of light 570 can escape cavity 548 through a selective optic 560 (e.g., a diffuser) associated with third optical avenue 540. Additionally, light source 552 can direct yet another portion of light 568 through a selective optic 558 (e.g., a window) associated with a second optical avenue 538. In this manner, plenum 542 can direct light from a single light source in at least three respective directions.

Figure 9:
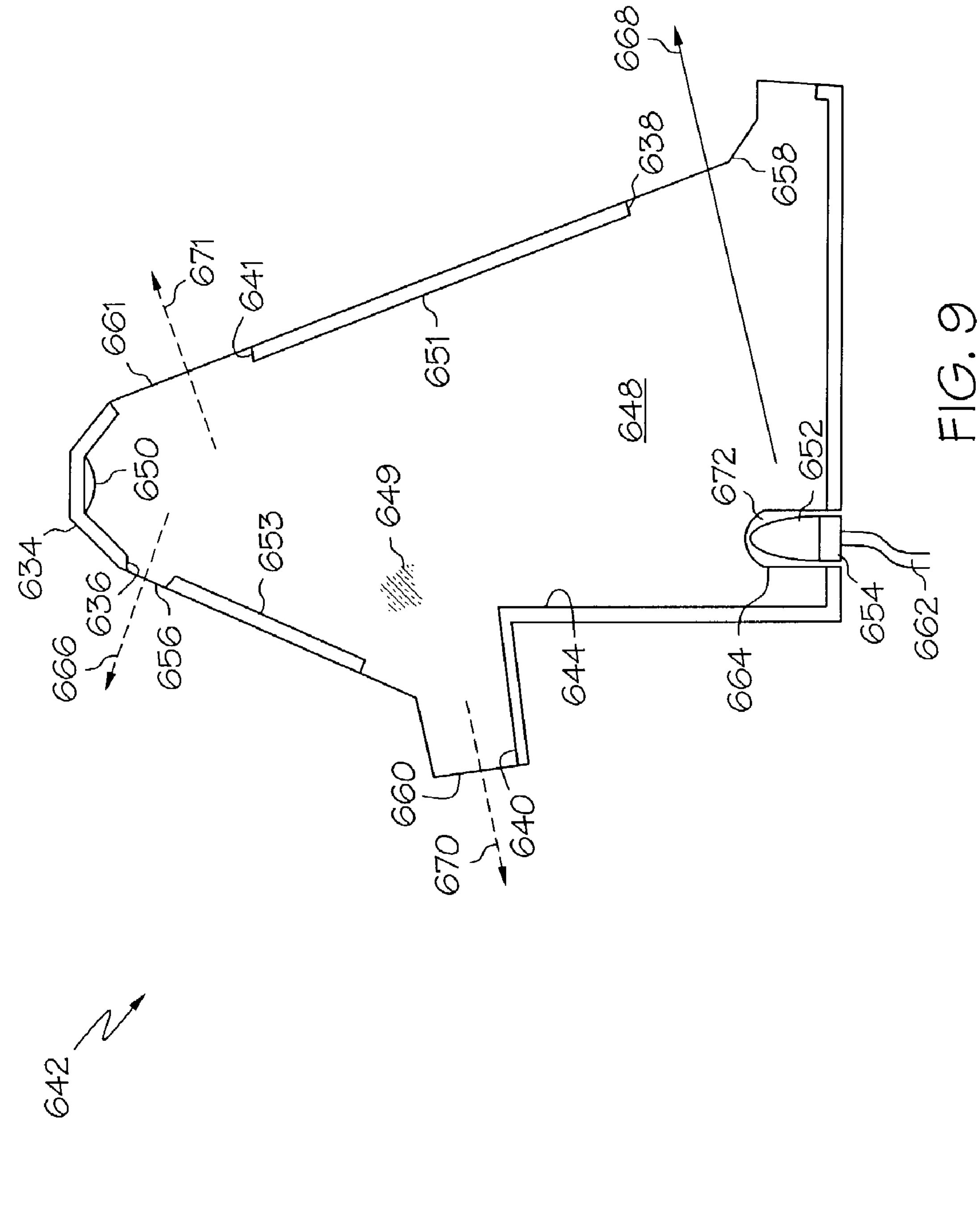
FIG. 9 is an enlarged cross-sectional view depicting still another exemplary embodiment of a plenum in accordance with the present invention.

Turning now to FIG. 9, a plenum 642 is disclosed having a shell 634 comprising an interior surface 644 substantially defining a cavity 648. In this example, cavity 648 is substantially filled with a plenum insert 649 formed from clear plastic. Light source 652 can be placed within a receptor 664 comprising a recess or void in plenum insert 649. A gap 672 might separate receptor 664 from light source 652. Light source 652 can receive power from a wire 662 fastened with a connector 654. Light source 652 generates light in multiple directions within cavity 648, wherein a portion of light 668 can escape directly from cavity 648 through a selective optic 658 associated with a second optical avenue 638. Other light from light source 652 can be reflected by one or more selective optics within or associated with cavity 648. For example, some light generated by light source 652 can be reflected from portions of interior surface 644, such as selective optic 651 and selective optic 653. In addition, some of the light generated by light source 652 can be reflected by selective optic 650, whereby selective optic 650 can comprise a convex mirror, for example. Regardless of how the light is reflected within cavity 648, a portion of light 666 can escape cavity 648 through a selective optic 656 associated with a first optical avenue 636. In addition, a portion of the light 670 can escape cavity 648 through a selective optic 660 associated with a third optical avenue 640. Furthermore, yet another portion of light 671 can escape the cavity 648 through a selective optic 661 associated with a fourth optical avenue 641. In this manner, a single light source can emit light in four distinct directions. In the exemplary plenum 642 depicted by FIG. 9, each of selective optics 656, 658, 660 and 661 are portions of plenum insert 649. Although portions of light 666, 668, 670, and 671 could be directed toward four respective control devices, in alternate embodiments, fewer or additional control devices could thereby be illuminated. For example, portions of light 666 and 670 could illuminate a first control device and portions of light 668 and 671 could illuminate a second control device.

Figure 10:
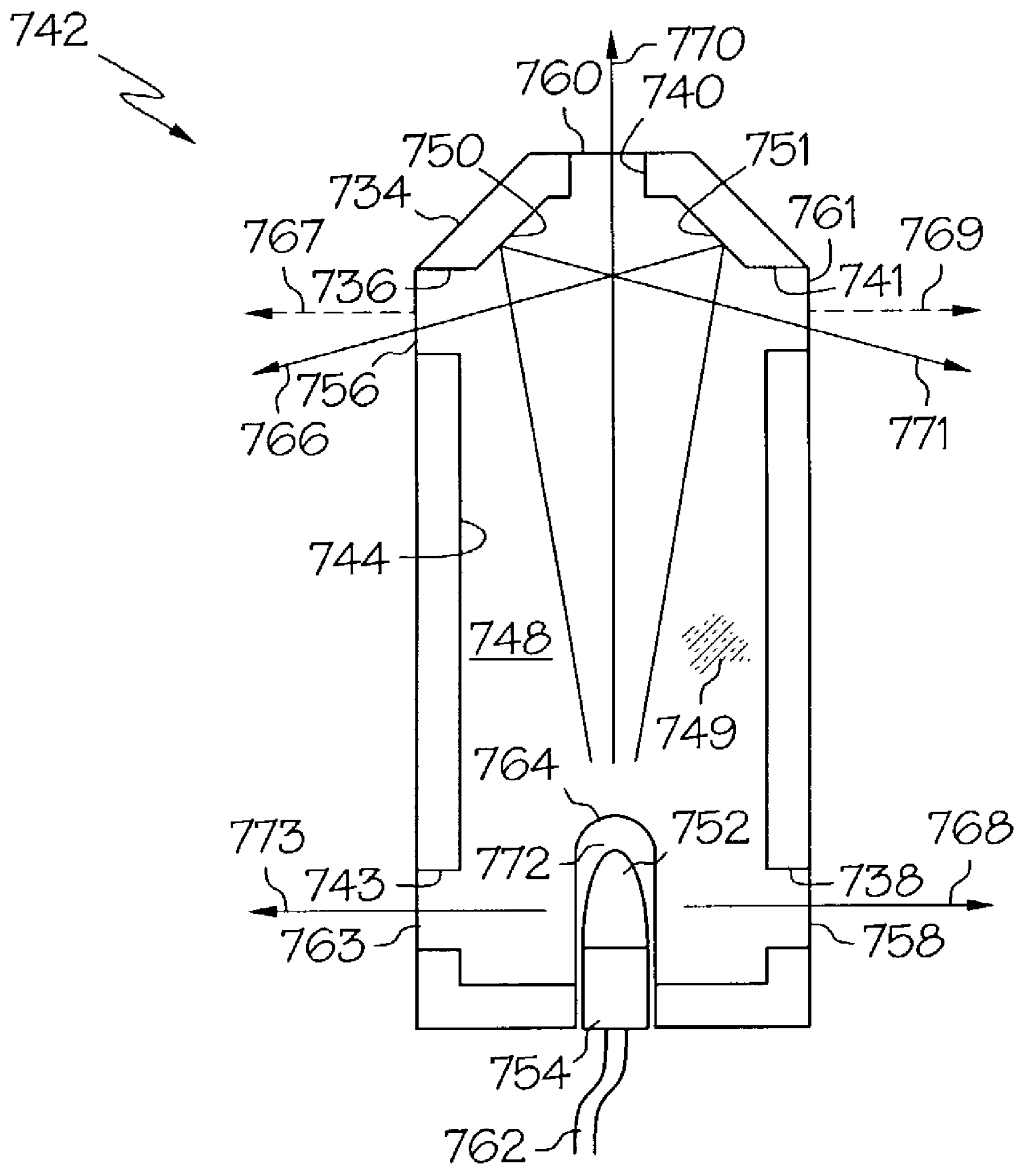
FIG. 10 is an enlarged cross-sectional view depicting yet another exemplary embodiment of a plenum in accordance with the present invention.

Turning now to FIG. 10, a plenum 742 is disclosed having a shell 734. Shell 734 can include an interior surface 744 that substantially defines a cavity 748. As depicted, cavity 748 can be substantially filled with a plenum insert 749 formed from clear plastic. Light source 752 can be placed within a receptor 764 comprising a recess or void in plenum insert 749, although a gap 772 might exist between receptor 764 and light source 752. Light source 752 can receive power through a wire 762 fastened with a connector 754 and can generate light in multiple directions through receptor 764 into cavity 748. As depicted, a portion of light 766 can be emitted by light source 752 and reflected by selective optic 751 (e.g., a reflective coating upon interior surface 744) through selective optic 756 associated with first optical avenue 736. In addition, a further indirect portion of light 767 can be emitted through first optical avenue 736 after having been reflected or otherwise manipulated by one or more selective optics (e.g., a reflective portion of interior surface 744) within or associated with cavity 748. Likewise, a portion of light 771 can be emitted from light source 752 and reflected by selective optic 750 (e.g., a reflective coating upon interior surface 744) through selective optic 761 associated with fourth optical avenue 741. Other indirect light 769 might also be emitted from fourth optical avenue 741 after having been reflected or otherwise manipulated by one or more selective optics within or associated with cavity 748.

Furthermore, a portion of light 773 emitted from light source 752 can pass directly through a selective optic 763 associated with a fifth optical avenue 743. Likewise, a portion of light 768 can pass directly from light source 752 through a selective optic 758 associated with a second optical avenue 738. Also, a portion of light 770 can be emitted from light source 752 and can pass directly through selective optic 760 associated with third optical avenue 740. In the exemplary plenum 742 depicted by FIG. 10, each of selective optics 756, 758, 760, 761 and 763 are portions of plenum insert 749. In this manner, portions of light 766, 767, 768, 769, 771, and 773 can be directed to illuminate control devices while portion of light 770 can be directed toward the driver.

FIG. 11 depicts yet another illuminated control assembly 822 in accordance with one embodiment of the present invention. The illuminated control assembly 822 can be of a type suitable for association with a motor vehicle or another piece of equipment, including but not limited to, for example, a generator, snowmobile, a lawn tractor, and any of the aforementioned motor vehicles or equipment. Illuminated control assembly 822 can include a key switch 830, a meter 831, a slide switch 832 and a plenum 842 associated with an enclosure 828 that may be mountable to the associated motor vehicle or equipment with fasteners (e.g., screw 898) through mounting apertures 894 and 896, for example. In an exemplary embodiment, slide switch 832 can include a handle 835 that moves linearly along a channel 837. Slide switch 832 can be configured to adjust the throttle, choke or other parameter relating to an electrical or mechanical system. Meter 831 can be configured to monitor fuel level, battery level, and/or temperature, for example.

In an exemplary embodiment, plenum 842 can be mounted upon enclosure 828 adjacent to each of the key switch 830, meter 831 and slide switch 832. Furthermore, plenum 842 can be configured to illuminate at least a portion of key switch 830, meter 831, and slide switch 832. In yet a further embodiment, plenum 842 can be configured to simultaneously illuminate key switch 830, meter 831, and slide switch 832 with only a single light source 852.

Figure 12:
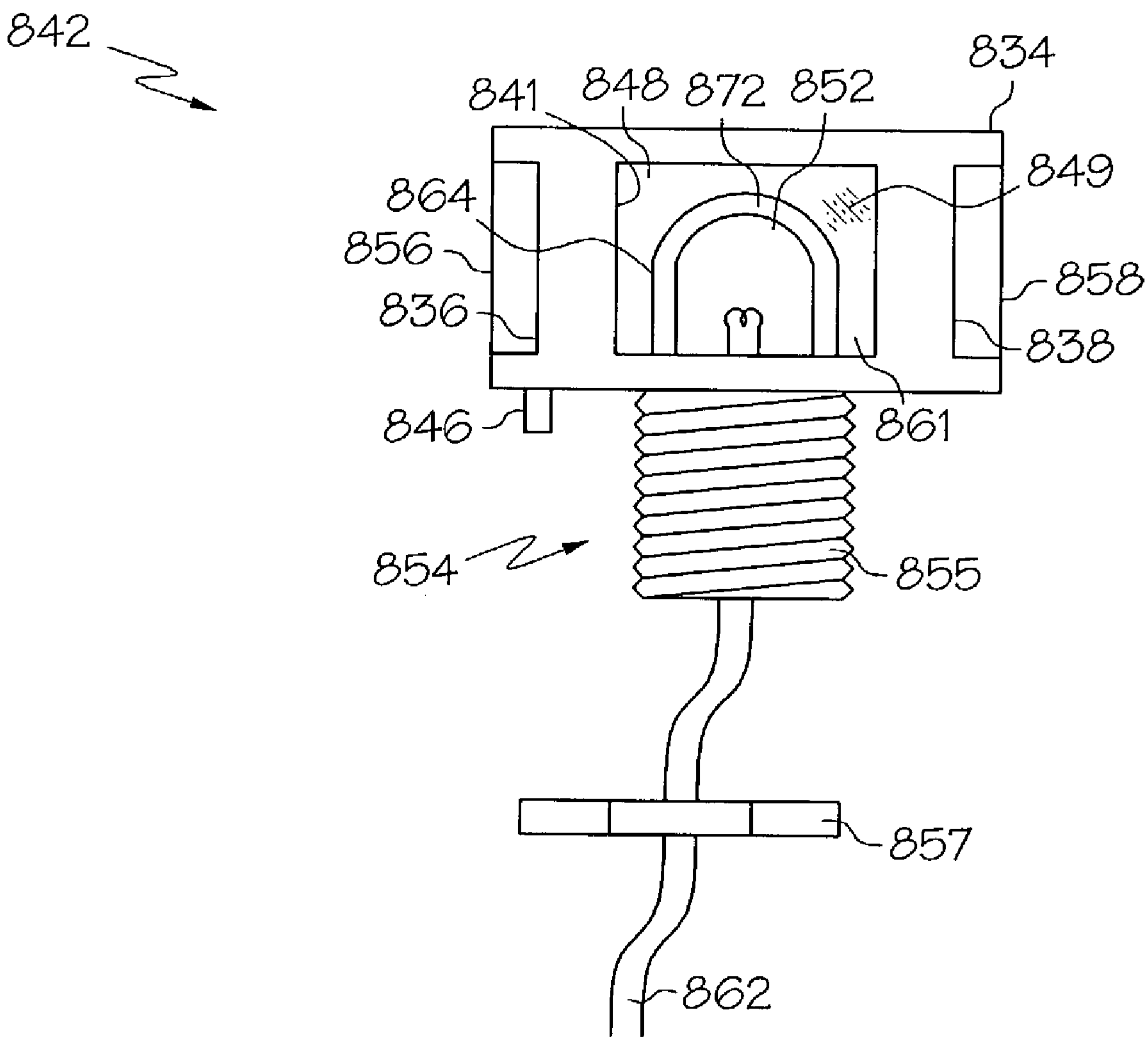
FIG. 12 is an enlarged front elevational view of the plenum of FIG. 11.

As shown in FIGS. 11 and 12, plenum 842 can comprise a shell 834 having an interior surface 844. Interior surface 844 can substantially define a cavity 848. In this example, cavity 848 might be at least partially filled with a plenum insert 849 formed from clear polycarbonate. In another embodiment, cavity 848 might be substantially filled with free air. A light source 852 can be configured to emit light into a receptor 864. If cavity 848 comprises plenum insert 849, receptor 864 can comprise a recess or void in plenum insert 849 and a gap 872 might separate receptor 864 from light source 852. Light source 852 might partially extend into a socket 854 having threads 855 upon which a nut 857 can progress, thereby enabling retention of plenum 842 to enclosure 828. Also, a wire 862 can interface socket 854 to provide power to light source 852. Furthermore, plenum 842 may comprise a tab 846 to engage an aperture (not shown) in enclosure 828 in order that plenum 842 cannot be undesirably rotated with respect to enclosure 828.

As shown in FIG. 11, for example, the outer configuration of plenum 842 can be polygonal, such as octagonal. In another embodiment, however, the outer configuration of plenum 842 can be substantially circular, or can assume practically any other shape. In the exemplary plenum depicted by FIGS. 11 and 12, a portion of light 866 from light source 852 is shown as being directed to key switch 830 through a selective optic 856 (e.g., a surface of plenum insert 849) associated with a first optical avenue 836.

Another portion of light 868 is shown as being directed from light source 852 to slide switch 832 through selective optic 858 (e.g., a surface of plenum insert 849) associated with second optical avenue 838. Furthermore, another portion of light 871 is shown as being directed from light source 852 to meter 831 through selective optic 861 (e.g., a surface of plenum insert 849) associated with a fourth optical avenue 841. In addition, yet another portion of light (not shown) can be directed from light source 852 through selective optic 860 (e.g., a diffuser) associated with a third optical avenue 840, such that an operator of illuminated control assembly 822 can verify operation of light source 852. Plenum 842 can also be equipped with one or more selective optics within cavity 848. For example, selective optic 850 can comprise a reflective portion of interior surface 844 that is configured to amplify or otherwise direct a portion of light 868 to slide switch 832. Additional optical avenues might also be provided within the plenum. Some of these additional optical avenues can be configured to illuminate portions of the enclosure that do not include control devices, but that might later be modified to include control devices. In other embodiments of the present invention, the plenum might be capable of being modified by a consumer to include a different number of optical avenues and/or different sized optical avenues.

It is to be understood from the above examples that a plenum in accordance with the present invention can be configured to illuminate two or more control devices in a seemingly endless variety of specific configurations. Although most of the above examples depict the illuminated control devices on opposite sides of the plenum, it is to be understood that the illuminated control devices can be located in virtually any position with respect to the plenum. Still further, a plenum in accordance with the present invention can illuminate multiple control devices, even when those control devices are disposed at different heights and/or distances with respect to each other, the optical avenues and/or the light source. Also, a plenum in accordance with the present invention can illuminate control devices using any combination of direct and indirect light, wherein indirect light can be achieved through any one or combination of selective optics.

In an exemplary embodiment of the present invention, a plenum insert (e.g., 49 in FIG. 3) for a cavity can be injection molded from clear polycarbonate. This plenum insert can then be insert-molded with black epoxy, whereby this insert-molding process can form a black epoxy enclosure having a plenum, wherein the plenum includes a shell covering at least part of the plenum insert. The portions of the plenum insert uncovered by the shell can comprise first, second and third optical avenues and can extend to be flush with the exterior surface of the shell (as shown by plenum 42 in FIG. 3, for example). First and second control devices can then be installed into the enclosure adjacent to the first and second optical avenues, and the third optical avenue can be configured for viewing by an operator. A light source can then be associated with the plenum and the enclosure can then be sealed and installed onto a motorcycle, for example. When power is applied to the light source, the first and second control devices can be at least partially illuminated by light emitted from the first and second optical avenues. The driver can look to the third optical avenue to assess functionality of the light source. Hence, both first and second control devices can be illuminated by a single light source in a simple, efficient, durable, watertight, and inexpensive manner.

The foregoing description of exemplary embodiments and examples of the invention has been presented for purposes of illustration and description. It is not intended to be exhaustive or to limit the invention to the forms described. Numerous modifications are possible in light of the above teachings. Some of those modifications have been discussed, and others will be understood by those skilled in the art. The embodiments were chosen and described in order to best illustrate the principles of the invention and various embodiments as are suited to the particular use contemplated. It is hereby intended that the scope of the invention be defined by the claims appended hereto.

We claim:

1. An illuminated control assembly comprising:

a control panel;

a first control device supported by the control panel and including a first portion accessible to an operator, the first portion configured for receiving contact from an operator in actuating the first control device;

a second control device supported by the control panel and including a second portion accessible to an operator, the second portion configured for receiving contact from an operator in actuating the second control device; and a light distribution plenum supported by the control panel adjacent to each of the first control device and the second control device, wherein the light distribution plenum is entirely fixed in place relative to the control panel and is always separate from each of the first control device and the second control device, the light distribution plenum comprising:

an interior surface substantially defining a cavity;

a light source configured to supply light into the cavity;

a first optical avenue configured to facilitate passage of a portion of the light from the cavity, through the atmosphere external to the control panel, and then onto the first portion to illuminate at least part of the first portion;

a second optical avenue different from the first optical avenue and configured to facilitate passage of a portion of the light from the cavity, through the atmosphere external to the control panel, and then onto the second portion to illuminate at least part of the second portion; and at least one selective optic associated with said light distribution plenum and configured to interact with at least a portion of the light.

2. The illuminated control assembly of claim 1 wherein said selective optic comprises a lens.

3. The illuminated control assembly of claim 1 wherein said selective optic comprises a prism.

4. The illuminated control assembly of claim 1 wherein said selective optic comprises a gas.

5. The illuminated control assembly of claim 1 wherein said selective optic comprises a filter.

6. The illuminated control assembly of claim 1 wherein said selective optic comprises a splitter.

7. The illuminated control assembly of claim 1 wherein said selective optic comprises a mirror.

8. The illuminated control assembly of claim 1 wherein the light source is configured to supply multi-directional light.

9. The illuminated control assembly of claim 1 wherein the light source comprises a single light bulb.

10. The illuminated control assembly of claim 1 wherein the light source comprises a single light emitting diode.

11. The illuminated control assembly of claim 1 wherein said selective optic is associated with the first optical avenue.

12. The illuminated control assembly of claim 1 wherein said selective optic is associated with the second optical avenue.

13. The illuminated control assembly of claim 1 wherein the first and second optical avenues are disposed at different distances from the light source.

14. The illuminated control assembly of claim 1 wherein the second optical avenue is configured to pass at least a portion of the light directly from the light source to the second portion.

15. The illuminated control assembly of claim 1 wherein the at least one selective optic comprises a plurality of selective optics.

16. The illuminated control assembly of claim 1 wherein a plenum insert is disposed at least partially within the cavity.

17. The illuminated control assembly of claim 1 wherein the first and second optical avenues are disposed at different heights.

18. The illuminated control assembly of claim 1 wherein the first optical avenue is configured to pass only indirect light from the light source to the first portion.

19. The illuminated control assembly of claim 1 wherein at least one of the first control device and the second control device are selected from the group comprising a switch, a gauge, a mechanical actuator, an indicator light, a lever, a slide switch, a rocker switch, a toggle switch, a key switch, a fluid level indicator, a rotary knob, a valve and an LCD display.

20. The illuminated control assembly of claim 1 being configured for placement and use in a location accessible to moisture and debris.

21. The illuminated control assembly of claim 1 wherein a plenum insert is disposed at least partially within the cavity.

22. The illuminated control assembly of claim 21 wherein said plenum insert comprises a selective optic.

23. The illuminated control assembly of claim 1 wherein said selective optic comprises a reflective surface.

24. The illuminated control assembly of claim 14 wherein at least a portion of the interior surface comprises the reflective surface.

25. The illuminated control assembly of claim 1 wherein said selective optic is configured to reflect a portion of the light through the first optical avenue to the first portion.

26. The illuminated control assembly of claim 25 wherein said selective optic is configured to reflect the entire portion of the light passing to the first portion.

27. The illuminated control assembly of claim 1 further comprising a third optical avenue in said light distribution plenum configured to direct a portion of the light.

28. The illuminated control assembly of claim 27 wherein said selective optic is associated with the third optical avenue.

29. The illuminated control assembly of claim 1 wherein the first portion and the second portion are disposed on opposite sides of the light distribution plenum.

30. The illuminated control assembly of claim 29 wherein the first and second optical avenues are oriented in opposite directions.

31. The illuminated control assembly of claim 1 wherein the first control device comprises a first pushbutton and the first portion comprises a first cap configured for selective depression by an operator in actuating the first pushbutton.

32. The illuminated control assembly of claim 31 wherein the second control device comprises a second pushbutton and the second portion comprises a second cap configured for selective depression by an operator in actuating the second pushbutton.

33. A motorcycle having an illuminated control assembly, the motorcycle comprising:

a control panel;

a first control device supported by the control panel and including a first portion accessible to an operator, the first portion configured for receiving contact from an operator in actuating the first control device;

a second control device supported by the control panel and including a second portion accessible to an operator, the second portion configured for receiving contact from an operator in actuating the second control device; and a light distribution plenum supported by the control panel adjacent to each of the first control device and the second control device, wherein the light distribution plenum is entirely fixed in place relative to the control panel and is always separate from each of the first control device and the second control device, the light distribution plenum comprising:

an interior surface substantially defining a cavity;

a light source configured to supply light into the cavity;

a first optical avenue configured to facilitate passage of a portion of the light from the cavity, through the atmosphere external to the control panel, and then onto the first portion to illuminate at least part of the first portion;

a second optical avenue different from the first optical avenue and configured to facilitate passage of a portion of the light from the cavity, through the atmosphere external to the control panel, and then onto the second portion to illuminate at least part of the second portion; and at least one selective optic associated with said light distribution plenum and configured to interact with at least a portion of the light.

34. The motorcycle of claim 33 wherein the first control device comprises a first pushbutton and the first portion comprises a first cap configured for selective depression by an operator in actuating the first pushbutton, and the second control device comprises a second pushbutton and the second portion comprises a second cap configured for selective depression by an operator in actuating the second pushbutton.

35. The motorcycle of claim 34 wherein at least one of the first control device and the second control device are selected from the group comprising a switch, a gauge, a mechanical actuator, an indicator light, a lever, a slide switch, a rocker switch, a toggle switch, a key switch, a fluid level indicator, a rotary knob, a valve and an LCD display.

36. A method for providing an illuminated control panel having a first control device and a second control device, the method comprising:

providing a control panel supporting a first control device and a second control device, the first control device including a first portion accessible to an operator, the first portion configured for receiving contact from an operator in actuating the first control device, the second control device including a second portion accessible to an operator, the second portion configured for receiving contact from an operator in actuating the second control device;

attaching a light distribution plenum to the control panel such that the light distribution plenum is adjacent to each of the first control device and the second control device, is always separate from each of the first control device and the second control device, and is entirely fixed in place relative to the control panel, the light distribution plenum having a selective optic, a cavity, a first optical avenue, and a second optical avenue, the cavity being in communication with the first and second optical avenues; and providing a light receptor within the cavity that is configured to receive light from a light source, wherein the light interacts with the selective optic and a portion of the light passes through the first optical avenue, through the atmosphere external to the control panel, and then onto the first portion to illuminate at least part of the first portion, and a portion of the light passes through the second optical avenue, through the atmosphere external to the control panel, and then onto the second portion to illuminate at least part of the second portion.

37. An all terrain vehicle having an illuminated control assembly, the all terrain vehicle comprising:

a control panel;

a first control device supported by the control panel and including a first portion accessible to an operator, the first portion configured for receiving contact from an operator in actuating the first control device;

a second control device supported by the control panel and including a second portion accessible to an operator, the second portion configured for receiving contact from an operator in actuating the second control device; and a light distribution plenum supported by the control panel adjacent to each of the first control device and the second control device, wherein the light distribution plenum is entirely fixed in place relative to the control panel and is always separate from each of the first control device and the second control device, the light distribution plenum comprising:

an interior surface substantially defining a cavity;

a light source configured to supply light into the cavity;

a first optical avenue configured to facilitate passage of a portion of the light from the cavity, through the atmosphere external to the control panel, and then onto the first portion to illuminate at least part of the first portion;

a second optical avenue different from the first optical avenue and configured to facilitate passage of a portion of the light from the cavity, through the atmosphere external to the control panel, and then onto the second portion to illuminate at least part of the second portion; and at least one selective optic associated with said light distribution plenum and configured to interact with at least a portion of the light.

38. The all terrain vehicle of claim 37 wherein the first control device comprises a first pushbutton and the first portion comprises a first cap configured for selective depression by an operator in actuating the first pushbutton, and the second control device comprises a second pushbutton and the second portion comprises a second cap configured for selective depression by an operator in actuating the second pushbutton.

39. The all terrain vehicle of claim 38 wherein at least one of the first control device and the second control device are selected from the group comprising a switch, a gauge, a mechanical actuator, an indicator light, a lever, a slide switch, a rocker switch, a toggle switch, a key switch, a fluid level indicator, a rotary knob, a valve and an LCD display.

* * * * *

UNITED STATES PATENT AND TRADEMARK OFFICE

CERTIFICATE OF CORRECTION

PATENT NO. : 6,974,222 B2
DATED : December 13, 2005
INVENTOR(S) : Mascadri et al.

It is certified that error appears in the above-identified patent and that said Letters Patent is hereby corrected as shown below:

Column 18,
Line 40, change “14” to -- 23 --.

Signed and Sealed this

Seventh Day of February, 2006

JON W. DUDAS
*Director of the United States Patent and Trademark Office*